(12) United States Patent
Nakatani et al.

(10) Patent No.: US 8,762,788 B2
(45) Date of Patent: Jun. 24, 2014

(54) REDUNDANCY CONTROL SYSTEM AND METHOD OF TRANSMITTING COMPUTATIONAL DATA THEREOF FOR DETECTION OF TRANSMISSION ERRORS AND FAILURE DIAGNOSIS

(75) Inventors: Hiroshi Nakatani, Tokyo (JP); Naoya Ohnishi, Tokyo (JP); Makoto Toko, Saitama-ken (JP); Motohiko Okabe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 371 days.

(21) Appl. No.: 13/206,898

(22) Filed: Aug. 10, 2011

(65) Prior Publication Data

US 2012/0047406 A1 Feb. 23, 2012

(30) Foreign Application Priority Data

Aug. 19, 2010 (JP) ................................ 2010-184440

(51) Int. Cl.
*G06F 11/14* (2006.01)
(52) U.S. Cl.
USPC .............................. 714/38.14; 714/11; 714/31
(58) Field of Classification Search
USPC ............. 714/11, 12, 31, 38.1, 38.14; 713/187
See application file for complete search history.

(56) References Cited

U.S. PATENT DOCUMENTS

| | | | | |
|---|---|---|---|---|
| 5,551,047 A | * | 8/1996 | Mori et al. ........................ | 712/28 |
| 6,038,683 A | * | 3/2000 | Shimamura et al. ............ | 714/11 |
| 6,772,368 B2 | * | 8/2004 | Dhong et al. ................... | 714/11 |
| 7,017,073 B2 | * | 3/2006 | Nair et al. ........................ | 714/11 |
| 7,346,780 B2 | * | 3/2008 | Sinha et al. ..................... | 713/187 |
| 7,451,325 B2 | * | 11/2008 | Aaron ........................... | 713/187 |
| 7,577,852 B2 | * | 8/2009 | Okazaki et al. ................ | 713/189 |
| 7,739,570 B2 | * | 6/2010 | Bag et al. ....................... | 714/736 |
| 8,117,461 B2 | * | 2/2012 | Bigelow et al. ................ | 713/187 |
| 8,135,963 B2 | * | 3/2012 | Sato et al. ...................... | 713/190 |
| 8,423,829 B2 | * | 4/2013 | Yamagata et al. .............. | 714/33 |
| 8,527,681 B2 | * | 9/2013 | Bogenberger et al. ........ | 710/107 |

FOREIGN PATENT DOCUMENTS

| | | |
|---|---|---|
| JP | 4-68616 | 3/1992 |
| JP | 4137387 | 6/2008 |

* cited by examiner

*Primary Examiner* — Joseph Schell
(74) *Attorney, Agent, or Firm* — Oblon, Spivak, McClelland, Maier & Neustadt, L.L.P.

(57) ABSTRACT

A redundancy control system and method of transmitting computational data are provided, for detection of transmission errors and failure diagnosis, including generating first computational data and generating first generated data using a first generation algorithm for error detection; generating second computational data and generating second generated data using a second generation algorithm for error detection; comparing the first/second computational data; transmitting transmission data including coincident computational data and the first/second generated data; generating, in the receiving device, computational data and third/fourth generated data from preset first/second generation algorithms; and comparing the first/third generated data and the first/third generated data, and detecting the presence or absence of an error in the received computational data.

8 Claims, 14 Drawing Sheets

REDUNDANCY CONTROL SYSTEM AND METHOD OF TRANSMITTING COMPUTATIONAL DATA THEREOF FOR DETECTION OF TRANSMISSION ERRORS AND FAILURE DIAGNOSIS

CROSS-REFERENCE TO RELATED APPLICATION

This application claims benefit of priority from Japanese Application No. JP 2010-184440 filed Aug. 19, 2010, the entire contents of which are incorporated by reference herein.

FIELD

Embodiments described herein relate generally to a redundancy control system and method of transmitting computational data thereof.

BACKGROUND

In a redundancy control system used in a control device for monitoring and controlling for example plant or field equipment, in which the processing device for data computation in the control device implements redundancy, there is a demand for a device equipped with an arrangement whereby failure of the control device itself can be detected without human intervention.

The transmission device constituting a structural element of this control device constitutes a connection interface between the devices that make up the redundancy control system. If failure of the control device itself cannot be detected, erroneous data may be wrongly recognized as correct data and transmitted from the transmission device.

As an arrangement for detecting errors in transmitted data produced by failure of the transmission equipment or external noise etc, the method is known of providing a CRC value computation device for error detection whereby the CRC (Cyclic Redundancy Check) value of the entire transmission data is accurately generated and attached thereto: errors in the transmitted data can thereby be detected at the receiving-end equipment. An example is disclosed in Japanese Laid-open Patent Application No. H 4-68616 (hereinafter referred to as Patent Reference 1).

Also, as an arrangement for confirming the correctness of computational data generated in a control device at the transmission end, in which high speed computational processing is made possible by duplicating a redundant processing device and ascertaining the correctness of transmitted computational data by performing a comparison of computational data between processing devices, the computational data generated by the processing devices of the respective processing systems is deemed to be correct if there is complete agreement between these processing devices; this comparison is performed without restriction to hardware synchronization. An example is disclosed in Published Japanese Patent No. 4137387 (hereinafter referred to as Patent Reference 2).

However, in the transmitted data error detection arrangement using a CRC computation device as disclosed in Patent Reference 1, even if, in the case of a redundant processing device using a duplicated system, the processing device belonging to one of these systems has failed, so long as either of the processing devices that generate computational data is healthy, the relationship between the computational data transmitted from the processing device to the transmission device and the CRC encoded data will be correct.

In this case, although the receiving end can detect transmission errors during transmission of transmission data from the transmission devices at the transmitting end, the receiving end is unable to confirm the fact that both of the two processing devices of the redundant processing device are working correctly, so it cannot distinguish whether the computational data transmitted from the processing device at the transmission end to the transmission device is data that has been transmitted as a result of a successful comparison between the processing devices of the two systems of the redundant processing device, or whether it merely consists in data that has been directly transmitted, computed solely by a processing device of one of these systems, without being verified by comparison.

Consequently, also if one of the processing device systems had failed and the comparison processing section had failed, the processing device being incapable of identifying this itself, there was therefore the problem that, since the relationship between the computational data and the CRC encoded data was correct, the receiving end was unable to distinguish whether or not the computational data transmitted from the processing device to the transmission device had been verified by confirmation of coincidence between the two processing systems by the redundant processing device.

According to an aspect of the present technology, an object is to provide a redundancy control system and a transmission method of computational data thereof whereby detection can be achieved of the errors generated in redundant processing devices in each of redundant systems and fault diagnosis can be achieved in each of redundant systems, by performing detection of transmission errors on transmission at the receiving end and providing means for confirming encoded data of each processing system of a redundant processing device at the receiving end, in respect of computational data transmitted through the transmission device from a redundant processing device.

In order to achieve the above object, a redundancy control system according to claim 1 of the present invention is constructed as follows. Specifically, there is provided:

A redundancy control system comprising a redundant processing device of the comparison redundancy type that compares first computational data of a first processing device and second computational data of a second processing device that receive the same control data and that execute the same computational processing in parallel and that returns coincident computational data, comprising: a control device wherein aforementioned first processing device generates aforementioned first computational data in accordance with aforementioned control data and generates first generated data using a first preset generation algorithm for error detection on response in respect of aforementioned first computational data; aforementioned second processing device generates aforementioned second computational data in accordance with aforementioned control data and generates second generated data using a second preset generation algorithm for error detection on response in respect of aforementioned second computational data, and, in addition, aforementioned first processing device comprises: a redundant processing device that compares aforementioned first computational data and aforementioned second computational data and outputs coincident aforementioned computational data and aforementioned first generated data/second generated data; and a first transmission device that receives transmission data including aforementioned computational data and aforementioned first generated data/second generated data and sends this from aforementioned redundant processing device to the transmission source of aforementioned control data; and a receiving device that comprises a second transmission device that transmits aforementioned control data to aforementioned first transmission device and that receives aforementioned transmission data from aforementioned first transmission device; and a third processing device that respectively generates third generated data/fourth generated data from received aforementioned computational data and aforementioned preset first generation algorithm/aforementioned second generation algorithm and identifies the presence of an error of aforementioned received computational data by comparison of received aforementioned first generated data and aforementioned third generated data and received aforementioned second generated data and aforementioned fourth generated data and the presence of failure of aforementioned first processing device or aforementioned second processing device; characterized in that the presence of error in the received computational data is identified using a generation algorithm of each processing device that generates computational data.

In order to achieve the above object, in the redundancy control system according to claim 3 of the present invention, in claim 1, in aforementioned redundant processing device, aforementioned first processing device additionally creates first signature data in respect of aforementioned control data by encryption processing using a first signature algorithm of a preset common key cryptosystem; aforementioned second processing device additionally creates second signature data in respect of aforementioned control data by encryption processing using a second signature algorithm of a preset common key cryptosystem;

aforementioned first processing device additionally returns to aforementioned first transmission device aforementioned transmission data including aforementioned first signature data/second signature data;

and aforementioned first transmission device additionally receives from aforementioned redundant processing device aforementioned transmission data including aforementioned computational data, aforementioned first generated data/second generated data and aforementioned first signature data/second signature data and sends this to the transmission source of aforementioned control data;

and aforementioned third processing device, additionally, is arranged to perform decoding processing on the received respective aforementioned first signature data and aforementioned second signature data, using the preset aforementioned first signature algorithm and aforementioned second signature algorithm, so as thereby to authenticate and identify the received aforementioned first signature data as having been generated by aforementioned first processing device and to authenticate and identify the received aforementioned second signature data as having been generated by aforementioned second processing device.

In order to achieve the above object, in the redundancy control system according to claim 5 of the present invention, in a redundancy control system comprising a redundant processing device of the comparison redundancy type that compares first computational data of a first processing device and second computational data of a second processing device that receive the same control data and that execute the same computational processing in parallel and that returns coincident computational data, aforementioned first processing device generates aforementioned first computational data in accordance with aforementioned control data and generates first generated data using a first generation algorithm for error detection on response in respect of aforementioned first computational data;

aforementioned second processing device generates aforementioned second computational data in accordance with aforementioned control data and generates second generated data using a second generation algorithm for error detection on response in respect of aforementioned second computational data, and, in addition, aforementioned first processing device comprises:

a control device comprising: a redundant processing device that compares aforementioned first computational data and aforementioned second computational data and, if coincidence is found, outputs aforementioned first computational data/second computational data and aforementioned first generated data/second generated data; and a first transmission device that receives transmission data including aforementioned first computational data/second computational data and aforementioned first generated data/second generated data and sends this from aforementioned redundant processing device to the transmission source of aforementioned control data; and a receiving device that comprises a second transmission device that transmits aforementioned control data to aforementioned first transmission device and that receives aforementioned transmission data from aforementioned first transmission device; and a third processing device that respectively generates fifth generated data from received aforementioned first computational data and aforementioned preset first generation algorithm and generates sixth generated data from aforementioned second computational data and aforementioned preset second generation algorithm and detects the presence of an error of aforementioned received first computational data and aforementioned second computational data by comparison of aforementioned first generated data and aforementioned fifth generated data with aforementioned second generated data and aforementioned sixth generated data and detects the presence of failure by comparison of received first computational data and second computational data;

and is characterized in that the respective presence or absence of error in the received first computational data/second computational data is identified by performing comparison of the first computational data and second computational data in parallel at the sending end and receiving end.

In order to achieve the above object, a method according to claim 6 of the present invention of transmission of computational data in a redundancy control system comprising a control device that compares first computational data of a first processing device and second computational data of a second processing device that receive the same control data and execute the same computational processing in parallel, and that returns coincident computational data, and a receiving device that receives this computational data, comprising:

in aforementioned control device; in aforementioned first processing device, a step of generating aforementioned first computational data in accordance with aforementioned control data and generating first generated data using a first preset generation algorithm for error detection on response in respect of aforementioned first computational data;

in aforementioned second processing device, a step of generating aforementioned second computational data in accordance with aforementioned control data and generating second generated data using a second preset generation algorithm for error detection on response in respect of aforementioned second computational data;

in aforementioned first processing device and aforementioned second processing device, a step of mutually comparing the first computational data and aforementioned second computational data and mutually switching the comparison result;

in aforementioned first processing device, a step of confirming coincidence of the comparison results of aforementioned first computational data and aforementioned second computational data and transmitting transmission data including coincident aforementioned computational data, aforementioned first generated data and aforementioned second generated data;

in aforementioned receiving device, a step of receiving aforementioned transmission data, and generating third generated data and fourth generated data from aforementioned computational data and the preset aforementioned first generation algorithm and aforementioned second generation algorithm;

a step of comparing aforementioned first generated data and aforementioned third generated data and aforementioned first generated data and aforementioned third generated data, to detect error in received aforementioned computational data; and characterized in that the presence or absence of an error of received computational data is identified using a generation algorithm for each processing device that generates computational data.

In order to achieve the above object, a method according to claim 7 of the present invention of transmission of computational data in a redundancy control system comprising a control device that compares first computational data of a first processing device and second computational data of a second processing device that receive the same control data and execute the same computational processing in parallel, and that returns coincident computational data, and a receiving device that receives this computational data, comprising:

in aforementioned control device, in aforementioned first processing device, a step of generating aforementioned first computational data in accordance with aforementioned control data and generating first generated data using a first preset generation algorithm for error detection on response in respect of aforementioned first computational data;

in addition, a step of generating first signature data in respect of aforementioned first computational data, using a preset first signature algorithm;

in aforementioned second processing device, a step of generating aforementioned second computational data in accordance with aforementioned control data and generating second generated data using a second preset generation algorithm for error detection on response in respect of aforementioned second computational data;

in addition, a step of generating second signature data in respect of aforementioned second computational data, using a preset second signature algorithm; in aforementioned first processing device and aforementioned second processing device, a step of mutually comparing the first computational data and aforementioned second computational data, mutually switching the comparison result, and sending aforementioned second generated data to aforementioned first processing device;

in aforementioned first processing device, a step of confirming coincidence of the comparison results of aforementioned first computational data and aforementioned second computational data and transmitting transmission data including this computational data, aforementioned first generated data, aforementioned second generated data and aforementioned first signature data/aforementioned second signature data;

in aforementioned receiving device, a step of receiving aforementioned transmission data, and generating third generated data and fourth generated data from aforementioned computational data and the preset aforementioned first generation algorithm and aforementioned second generation algorithm;

a step of comparing aforementioned first generated data and aforementioned third generated data and aforementioned second generated data and aforementioned fourth generated data, to detect error in received aforementioned computational data;

a step of, in addition, generating respectively third signature data and fourth signature data, using the preset aforementioned first signature algorithm and aforementioned second signature algorithm, from aforementioned computational data; and a step of independently comparing aforementioned first signature data and aforementioned third signature data, and aforementioned second signature data and aforementioned fourth signature data, to perform authentication and identification as to whether or not the received computational data is data from the preset processing device; characterized in that error identification of the received computational data and authentication and identification of the device that generated the computational data are thereby performed.

In order to achieve the above object, a method according to claim 8 of the present invention of transmission of computational data in a redundancy control system comprising a control device that compares first computational data of a first processing device and second computational data of a second processing device that receive the same control data and execute the same computational processing in parallel, and that returns coincident computational data, and a receiving device that receives this computational data, comprises:

in aforementioned control device, in aforementioned first processing device, a step of generating aforementioned first computational data in accordance with aforementioned control data and generating first generated data using a first preset generation algorithm for error detection on response in respect of aforementioned first computational data;

in aforementioned second processing device, a step of generating aforementioned second computational data in accordance with aforementioned control data and generating second generated data using a second preset generation algorithm for error detection on response in respect of aforementioned second computational data;

in aforementioned first processing device and aforementioned second processing device, a step of mutually comparing the first computational data and aforementioned second computational data and mutually switching the comparison result; in aforementioned first processing device, a step of confirming coincidence of the comparison results of aforementioned first computational data and aforementioned second computational data and transmitting transmission data including this first computational data and aforementioned second computational data, aforementioned first generated data and aforementioned second generated data;

in aforementioned receiving device, a step of receiving aforementioned transmission data, and generating fifth generated data from aforementioned first computational data and the preset aforementioned first generation algorithm;

a step of receiving aforementioned transmission data, and generating sixth generated data from aforementioned second computational data and the preset aforementioned second generation algorithm; and a step of comparing aforementioned first generated data and aforementioned fifth generated data and aforementioned second generated data and aforementioned sixth generated data, to detect error in received aforementioned first computational data and aforementioned second computational data and comparing received aforementioned first computational data and aforementioned second computational data; characterized in that detection of the respective presence or absence of error in the received first computational data/second computational data and comparison of the first computational data and second computational data are thus effected in parallel at the transmitting end and receiving end.

Thus, with the present invention, a redundancy control system and a method of transmission of computational data thereof can be provided wherein detection of transmission error on transmission can be performed at the receiving end in respect of computational data transmitted through a transmission device from a redundant processing device and error in the computational data in each redundancy system generated by a redundant processing device, and failure diagnosis of each redundancy system, are possible.

DETAILED DESCRIPTION

Figure 1:
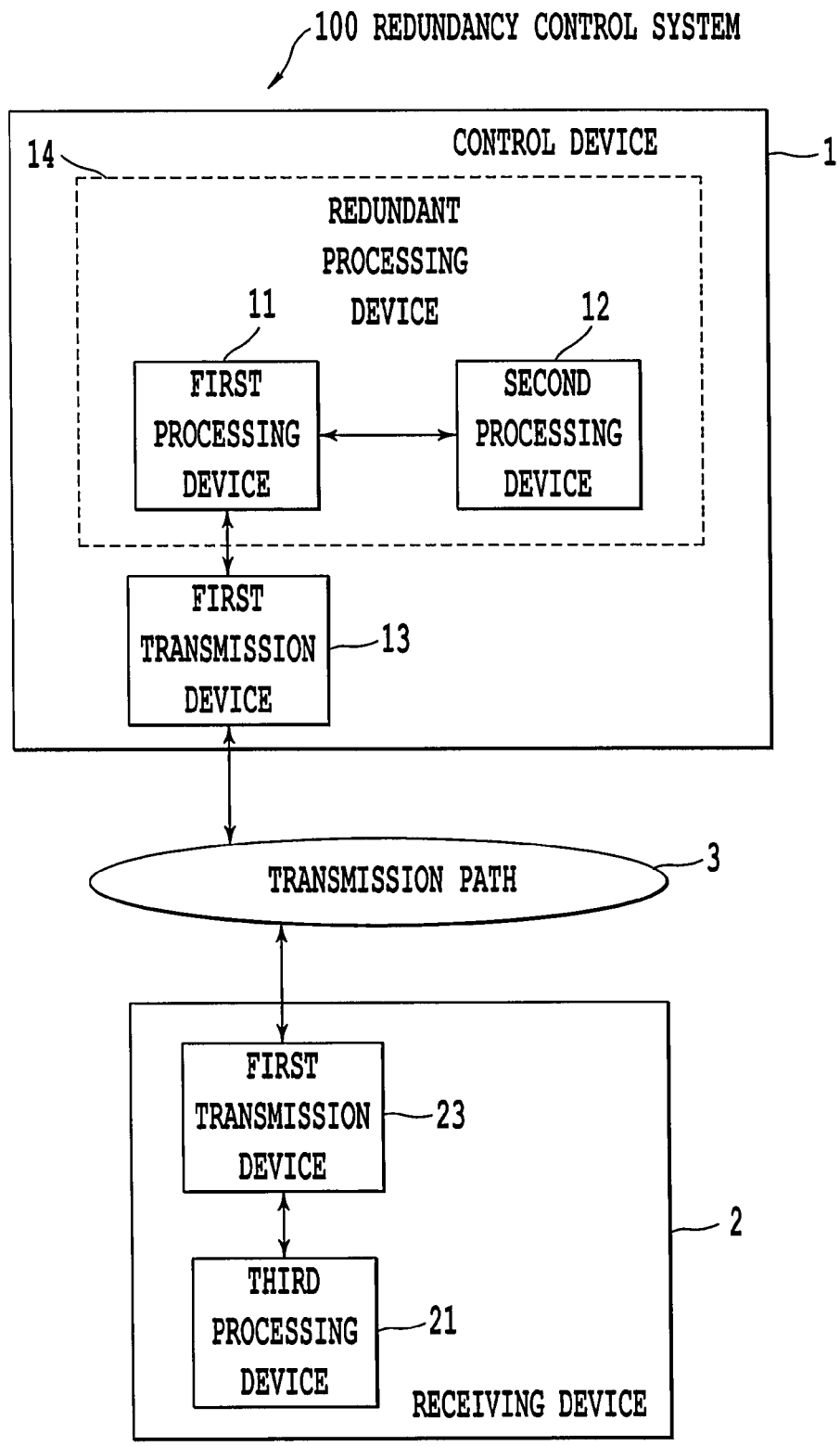
FIG. 1 is a layout diagram of a redundancy control system according to the present invention.

The present embodiment is described below with reference to the drawings.

Embodiment 1

Embodiment 1 is described below with reference to FIG. 1 to FIG. 4. First of all, the layout (structure) of a redundancy control system 100 according to this embodiment will be described with reference to FIG. 1. A redundancy control system 100 comprises: a control device 1 that receives control data and generates computational data; a receiving device (receiver) 2 that transmits control data and receives computational data from the control device 1; and a transmission path 3 that connects these.

In the redundancy control system 100, the transmission path 3 may be constituted by a network, and the layout may comprise a plurality of receiving devices 2 and a plurality of control devices 1; the control data and computational data may be exchanged between control devices of the same construction. The case of transmission between a pair of a control device 1 and receiving device 2 will now be described.

Also, the construction of the redundancy control system 100 comprises: a control device 1 that compares first computational data of a first processing device 11 and second computational data of a second processing device 12 that receive the same control data and execute the same computational processing in parallel, and comprising a redundant processing device 14 of the comparison redundancy type that returns the computational data after confirming coincidence thereof; and a receiving device 2 that transmits control data through a transmission path 3 to the control device 1, and that, on receiving the computational data from the control device 1, determines whether or not there is an error in the computational data that it has received.

Figure 2A:
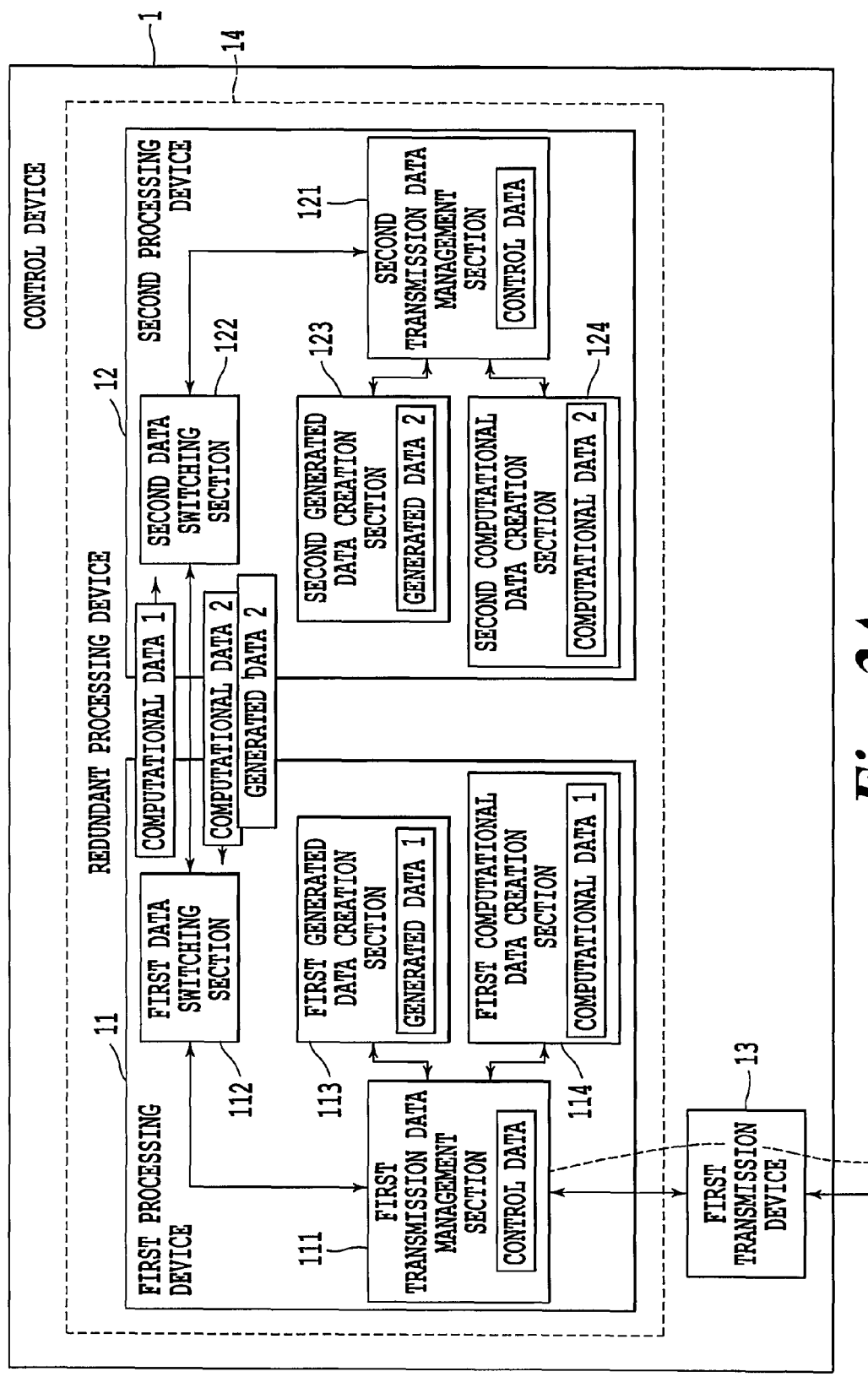
FIG. 2A is the first part of an operating diagram of a redundancy control system according to Embodiment 1 of the present invention.
Figure 2B:
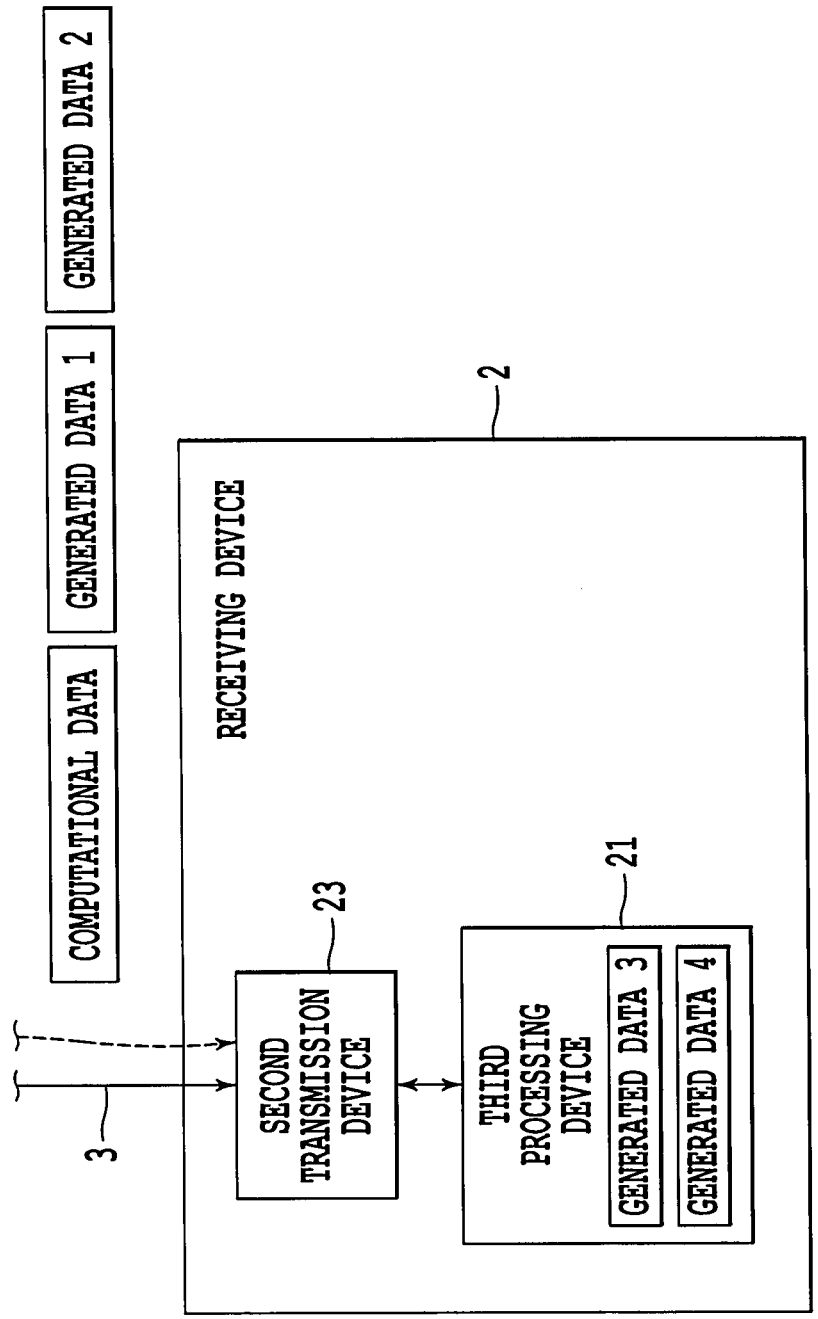
FIG. 2B is the second part of the operating diagram of a redundancy control system according to Embodiment 1 of the present invention.

Next, the construction of the various sections will be described with reference to FIGS. 2A-2B. The numerical values 1, 2 that are suffixed to the respective data items that appear in FIGS. 2A-2B are abbreviations meaning respectively first and second: for example, the data referred to as "computational data 2" indicates the second computational data (the same applies in subsequent Figures).

The control device 1 comprises a redundant processing device 14 having: a first processing device 11 that generates first computational data based on the control data that it has received, and that generates first generated data using a first generation algorithm for error detection on a preset response in respect of this first computational data; and a second processing device 12 that generates second computational data based on the control data that it has received, and that generates second generated data using a second generation algorithm for error detection on a preset response in respect of the second computational data.

The first processing device 11 compares the first computational data and the second computational data and outputs computational data whose coincidence has been confirmed and also outputs first generated data/second generated data.

In addition, there is provided a first transmission device (transmitter) 13 that receives transmission data, including computational data and first generated data/second generated data, from the redundant processing device 14 and sends this to the transmission source of the control data.

In addition, the receiving device 2 comprises: a second transmission device (transmitter) 23 that transmits control data to the first transmission device 13 and receives the transmitted data from the first transmission device 13; and a third processing device 21 that, from the received computational data and a first generation algorithm/second generation algorithm that are set beforehand, respectively generates third generated data/fourth generated data, compares the first generated data and third generated data, or the second generated data and fourth generated data, and thereby identifies existence of an error of the received computational data and failure of the first processing device or second processing device.

Next, the details of the redundant processing device 14 having the first processing device 11 and the second processing device will be described.

First of all, the first processing device 11 comprises: a first transmission data management section 111 that receives control data from the first transmission device 13, sends this control data and first computational data to a first data switching section 112, to be late described, and mutually switches the first computational data and second computational data and, on confirming coincidence of the mutual comparison results, returns transmission data including the coincident computational data to the first transmission device 13; a first computational data creation section 114 that receives control data from the first transmission data management section 111 and that creates and returns first calculation data after execution of a preset computational program; the aforementioned first generated data creation section 113 that receives the first computational data found by its own processing device 11 and generates and returns first generated data for error detection on return of the first computational data, using a preset first generation algorithm; and a first data switching section 112 that transmits the first computational data to a second processing device 12, to be later described, and that sends transmission data including the comparison result thereof with the second computational data transmitted from the first processing device 12 to the first transmission data management section 111.

Also, the second processing device 12 comprises: a second data switching section 122 that receives control data and first computational data from the first processing device 11, and that sends transmission data including the result of comparison of the first computational data and second computational data to the first data switching section 112; a second transmitted data management section 121 that receives control data from the second data switching section 122 and that creates transmission data, which it returns to the first processing device 11 through the first data switching section 112; a second computational data creation section 124 that receives control data from the first transmission data management section 121 and, by executing the same computational program, set beforehand, as was set in the first processing device 11, generates the aforementioned second computational data, which it returns; and a second generated data creation section 123, that receives the second computational data from the second transmission data management section 121 and generates and returns, using the second generating algorithm that was set beforehand, second generated data for error detection on return of the second computational data.

It should be noted that, so long as the first processing device 11 and second processing device 12 can receive control data and find and return computational data, they could be constituted by a computation device provided with for example a computation CPU that sends and receives through the transmission path 3 and that finds computational data, and a memory for storing a computational program and/or data.

Also, the first generating algorithm that generates first generated data and the second generating algorithm that generates second generated data could employ for example a function such as a cyclic redundancy check; the respective functions employed could be different functions; and the first generated data and second generated data may have different values.

By adopting such a construction, the receiving device 2 finds the presence (or absence) of error in the computational data received by using the first generation algorithm and second generation algorithm of the transmission source, and hence obtains the third generated data/fourth generated data, respectively: the received first generated data/second generated data and the generated third generated data/fourth generated data are then individually compared and, if an error is present, a decision can be made as to by which system, of the two processing device systems, this error is caused.

Figure 3:
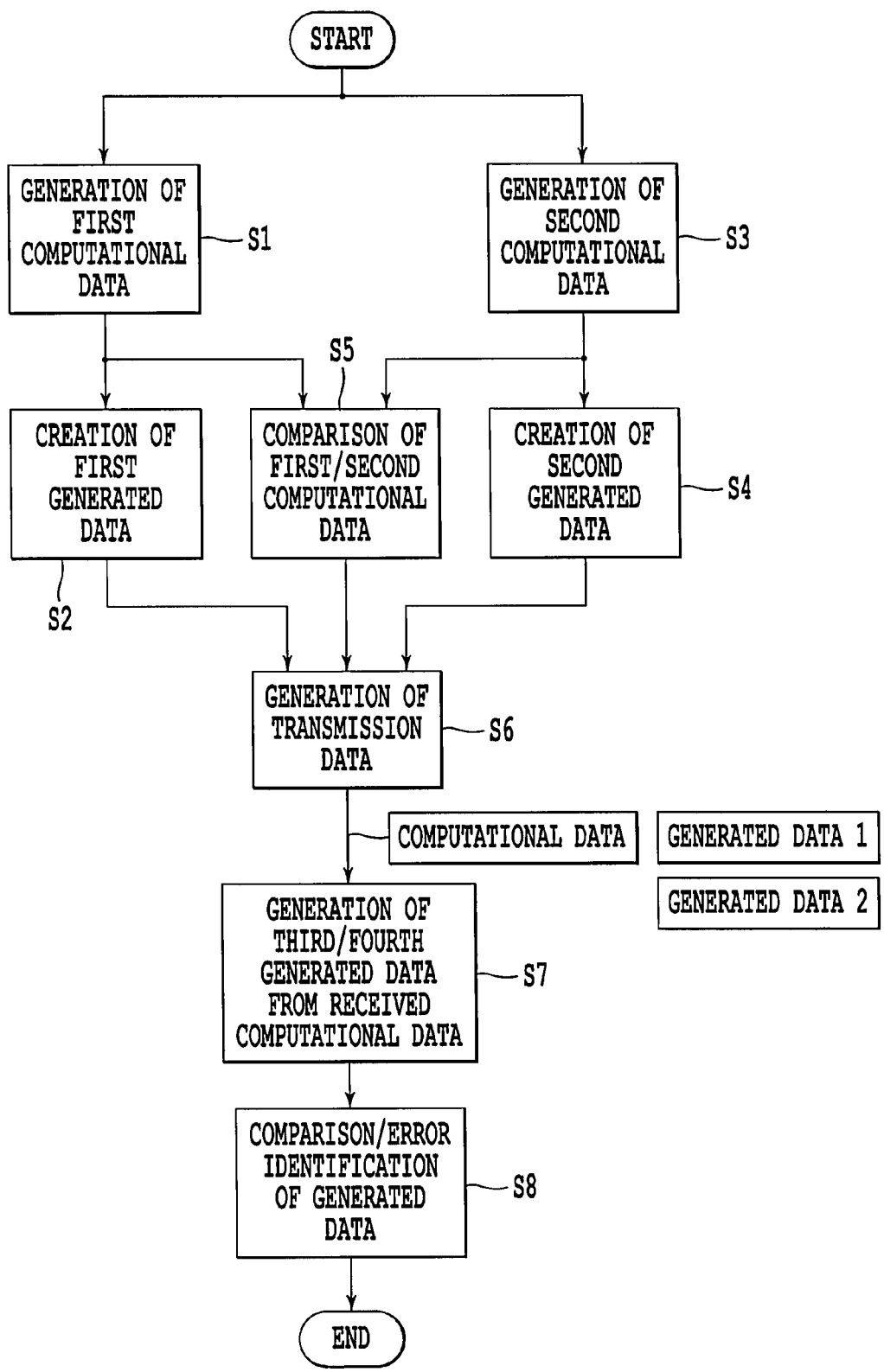
FIG. 3 is a flowchart given in explanation of the operation of the redundancy control system according to Embodiment 1 of the present invention.

Next, the operation of this Embodiment 1 constructed in this way will be described with reference to the processing flow chart of FIG. 3, and FIGS. 4A-4B.

Figure 4A:
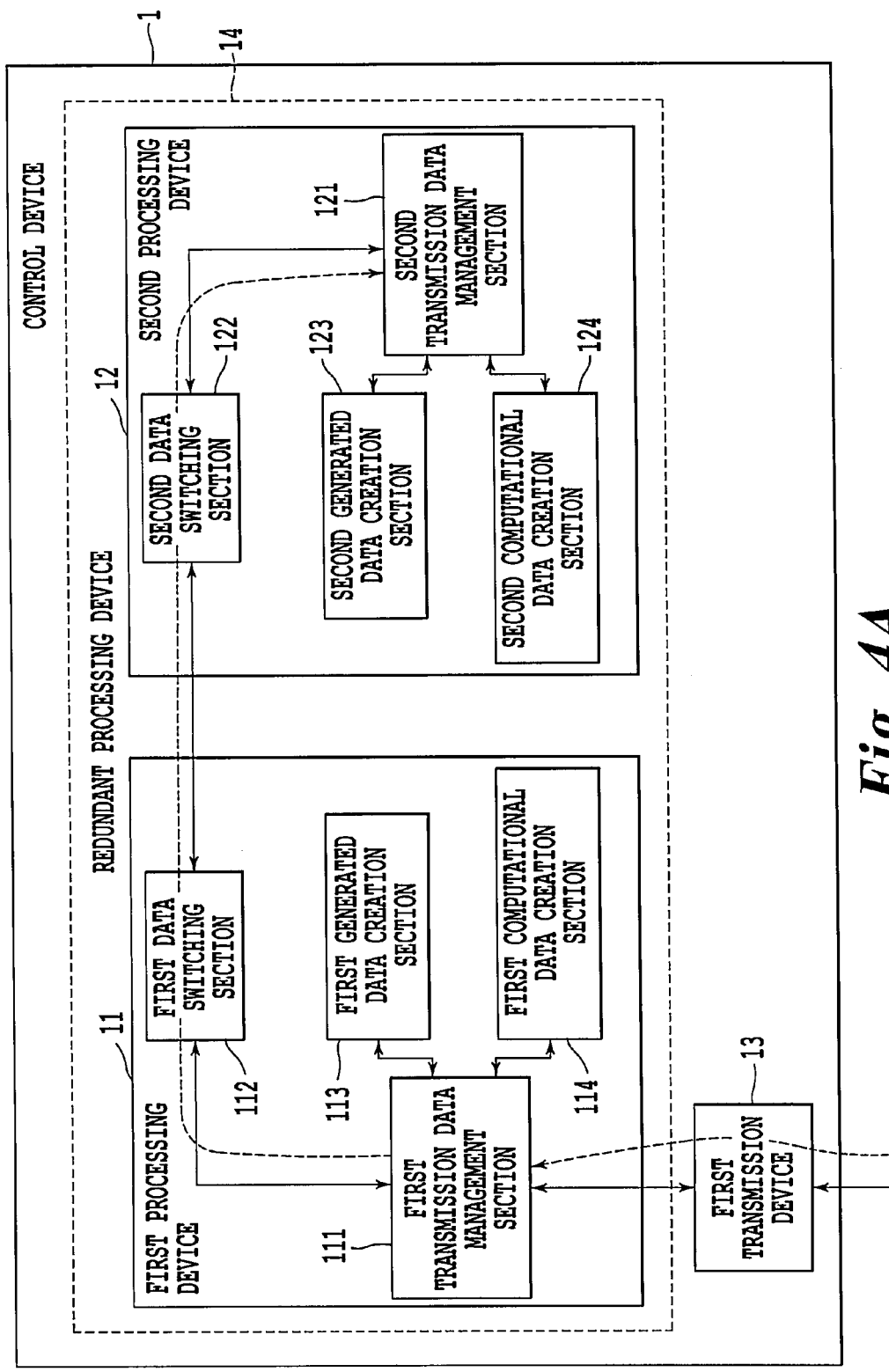
FIG. 4A is the first part of another operating diagram of the redundancy control system according to Embodiment 1 of the present invention.
Figure 4B:
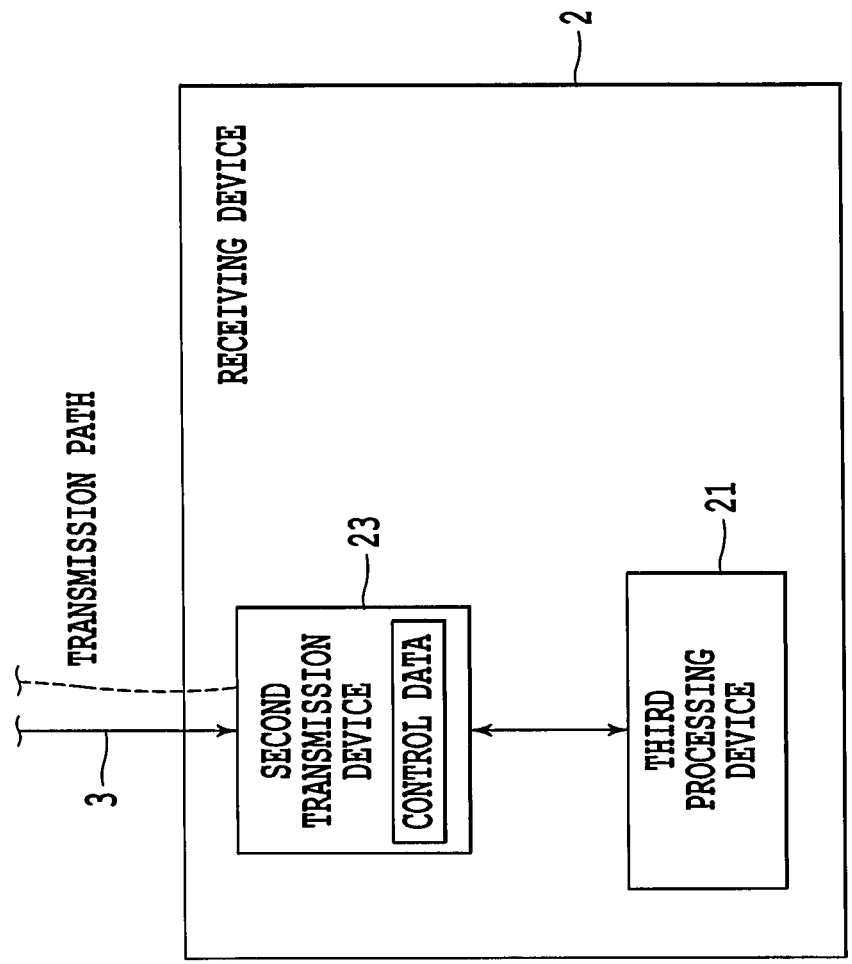
FIG. 4B is the second part of the other operating diagram of a redundancy control system according to Embodiment 1 of the present invention.

First of all, as shown by the broken line arrows in FIGS. 4A-4B, the control device 1 receives for example control data from the receiving device 2 constituting an input/output terminal, through the transmission path 3 and first receiving device 13, and stores this same control data in the first transmission data management section 111 and transmission data management section 121.

Specifically, the control data that is sent to the second processing device 12 passes through the first transmission data management section 111, data switching section 112, and second data switching section 122, before being stored in the second transmission data management section 121.

Next, the processing operation of computational data in response to the transmitted control data will be described with reference to FIG. 3.

The same control data that was stored in the first transmission data management section 111 and the second transmission data management section 121 is employed in the computational data creation section 114 and computational data creation section 124 to generate (s1, s3) respectively first computational data/second computational data, using the same computational program that was stored beforehand.

Next, from the first computational data, the first generated data creation section 113, by computational processing (for example CRC code calculation) using a specified algorithm, calculates (s2) the first generated data (for example the CRC-encoded data of the first computational data).

Likewise, the second generated data creation section 123, from the second computational data, by computational processing (for example, CRC code calculation) using a specified algorithm, calculates second generated data (for example, the CRC code data of the second computational data) (s2).

Next, the redundant processing device 14, in order to confirm the correctness of the computation result of the first computational data and the second computational data, switches the first computational data and the second computational data between the first person device 11 and the second processing device 12.

Thereupon, the first computational data is transferred from the data switching section 112 to the second data switching section 122 and the second computational data is transferred from the data switching section 122 to the first data switching section 112.

The first transmission data management section 111 then performs comparison of the first computational data generated by the first processing device 11 and the second computational data transferred from the second processing device 12. If now the processing of the first processing device 11 and the second posting device 12 is being correctly executed, the first computational data and the second computational data ought necessarily to agree.

Also, in the same way, the second transmission data management section 121 performs data comparison of the second computational data generated by the second processing device 12 and the first computational data transferred thereto from the first processing device 11.

Also, the comparison results obtained by the respective devices are switched (s5), by means of the data switching section 112 and the data switching section 122.

Next, the first processing device 11 that was preset to confirm coincidence of the first computational data and the second computational data then creates transmission data for transmission to the receiving device (receiver) 2 and transmits this (s6) to the receiving device 2 through the first transmission device 13. This transmission data includes the computational data constituted by the coinciding first computational data and second computational data, and the first generated data and second generated data transferred from the second processing device 12.

Next, the receiving device 2 that received the transmission data performs checking calculation processing to ascertain whether or not the received computational data was correctly transmitted, using the first generated data and second generated data incorporated in the transmission data in the third processing device 21.

Now in the third processing device 21 there are stored beforehand the first generation algorithm and second generation algorithm incorporated in the first generated data creation section 113 and second generated data creation section 123.

First of all, the third processing device 21 confirms whether or not the computational data, first generated data and second generated data are incorporated in the transmission data.

If, let us say, the second generated data arrived in an empty condition (for example, all bits being zero), the receiving device 2 can detect generation of abnormality in the control device 1, such as for example, that abnormality was generated somewhere in the first data switching section 112, causing transmission of the second generated data to the first processing device 11 to fail, or that abnormality was generated in the second processing device 12, causing the second generated data not to be created.

Next, the third processing device 21 newly generates (s7) third generated data from the computational data in the received transmitted data, using the same generation algorithm as in the first generated data creation section 113.

Next, comparison processing of the first generated data and third generated data is performed. If coincidence is found, it can be concluded that the computational data and the first generated data have been correctly transmitted to the receiving device 2 and that generation processing of the first generated data in the first processing device 11 has been correctly performed. Non-coincidence means that the computational data has been changed to erroneous data in any of the transmission path 3 or a first transmission device 13 or second transmission device 23, or that abnormality has been generated in the first/second generation algorithm in the processing device 1 or the receiving device 2: an error in the processing system of the first processing device can thereby be detected (s8).

Next, the third processing device 21 newly creates (s7) fourth generated data from the computational data in the received transmission data, using the same second generation algorithm as the second generated data creation section 123 in respect of the second processing system etc, in the same way as the system of the first processing device.

Comparison processing of the second generated data and fourth generated data is then performed. If coincidence is found, it can be concluded that the computational data and second generated data have been correctly transmitted to the receiving device 2 and that processing of the second generated data in the second processing device has been correctly performed.

Non-coincidence means that the computational data has been changed to erroneous data in any of the transmission path 3, first transmission device 13 and second transmission device 23, or that abnormality has been generated in the control device 1 or the first/second generation algorithm in the receiving device 2: such errors can therefore be detected.

With the redundancy control system 100 according to this embodiment constructed in this way, in the transmission data created in the redundant processing device 14, the first computational data and second computational data created by the first processing device 11 and second processing device 12 are compared, and transmission data including coincident computational data, first generated data created solely by the first processing device 11 and second generated data created solely by the second processing device 12 are transmitted: thus the receiving device 2, by checking for transmission errors in the computational data using these items of generated data and thereby detecting omissions or errors in the first/second generated data, can detect failure of each of the processing systems of the first processing device and second processing device of the redundant processing device 14, or failure of both systems.

Specifically, with the conventional transmission error detection arrangement, in regard to transmission errors generated on the transmission path, the method was adopted of generating generated data in respect of the transmission data and detecting this at the receiving device: consequently, if the value of the computational data itself, before the generated data was found, was erroneous, the generated data would be found in respect of erroneous computational data.

Consequently, since the receiving device could only confirm that transmission had taken place correctly on the transmission path, it was not possible to detect the fact that the value of the computational data itself was erroneous.

In contrast, in the redundancy control system according to Embodiment 1, the arrangement is such that comparison processing is performed of the computational data found in the first processing device 11 and second processing device 12, and the first computational data generated in the first processing device 11 is sent to the receiving device 2 as transmission data together with the second generated data generated by the second processing device, after coincidence of the computational data has been confirmed.

Consequently, not only can the receiving device 2 detect errors on the transmission path of the computational data but the receiving device 2 can also detect the existence of failure of the first processing device 11 or second processing device 12, in each processing system thereof.

In this way, not only can errors on the transmission path be detected but it is also possible to detect errors of the computational data computed in the first/second processing devices and failure of the processing system thereof etc.

Embodiment 2

Next, a redundancy control system according to Embodiment 2 will be described with reference to FIGS. 5A-5B and FIG. 6. Portions in Embodiment 2 that are the same as portions illustrated in FIG. 1 are given the same reference symbols and further description thereof is dispensed with.

Figure 5A:
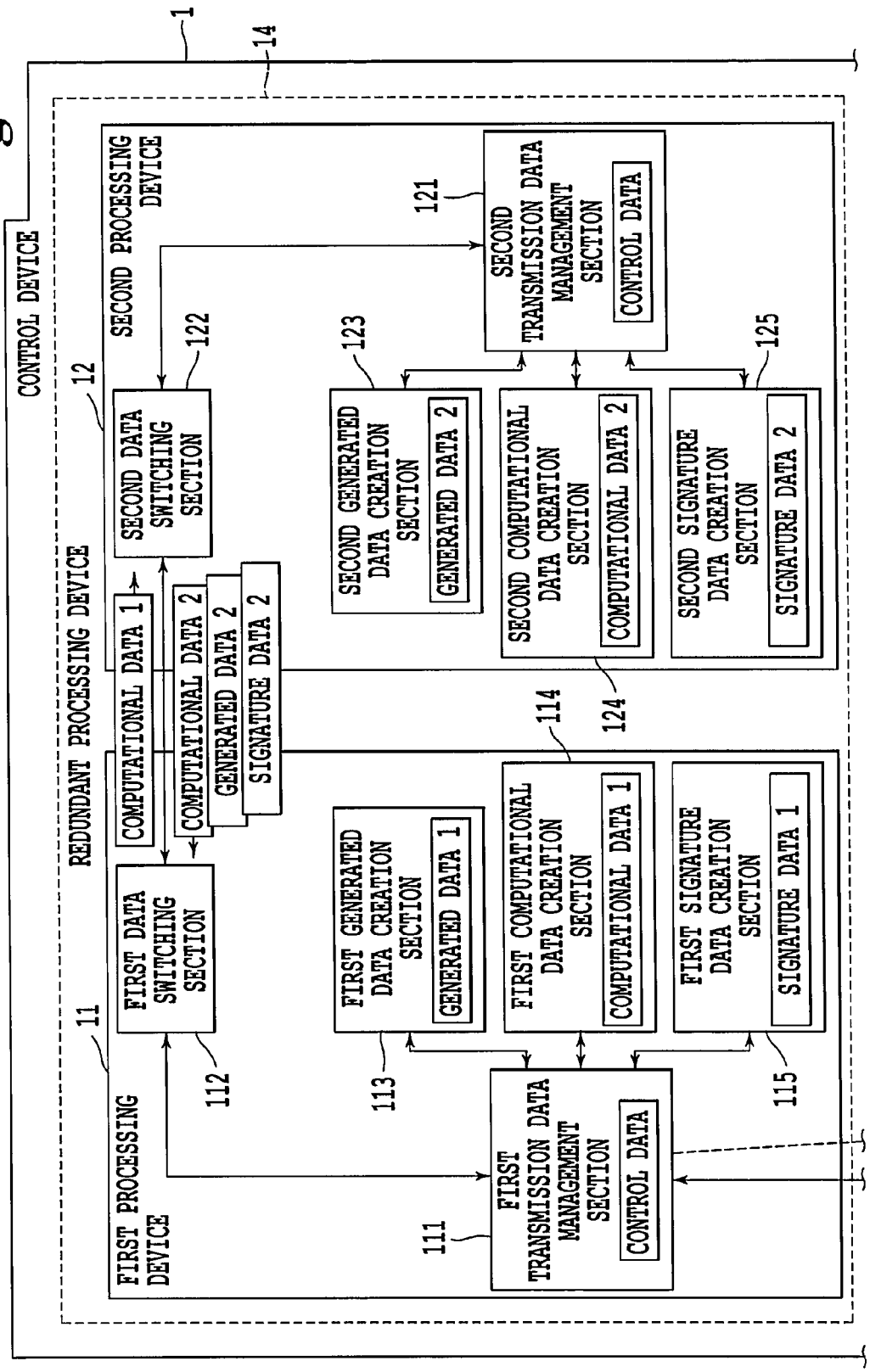
FIG. 5A is the first part of an operating diagram of a redundancy control system according to Embodiment 2 of the present invention.
Figure 5B:
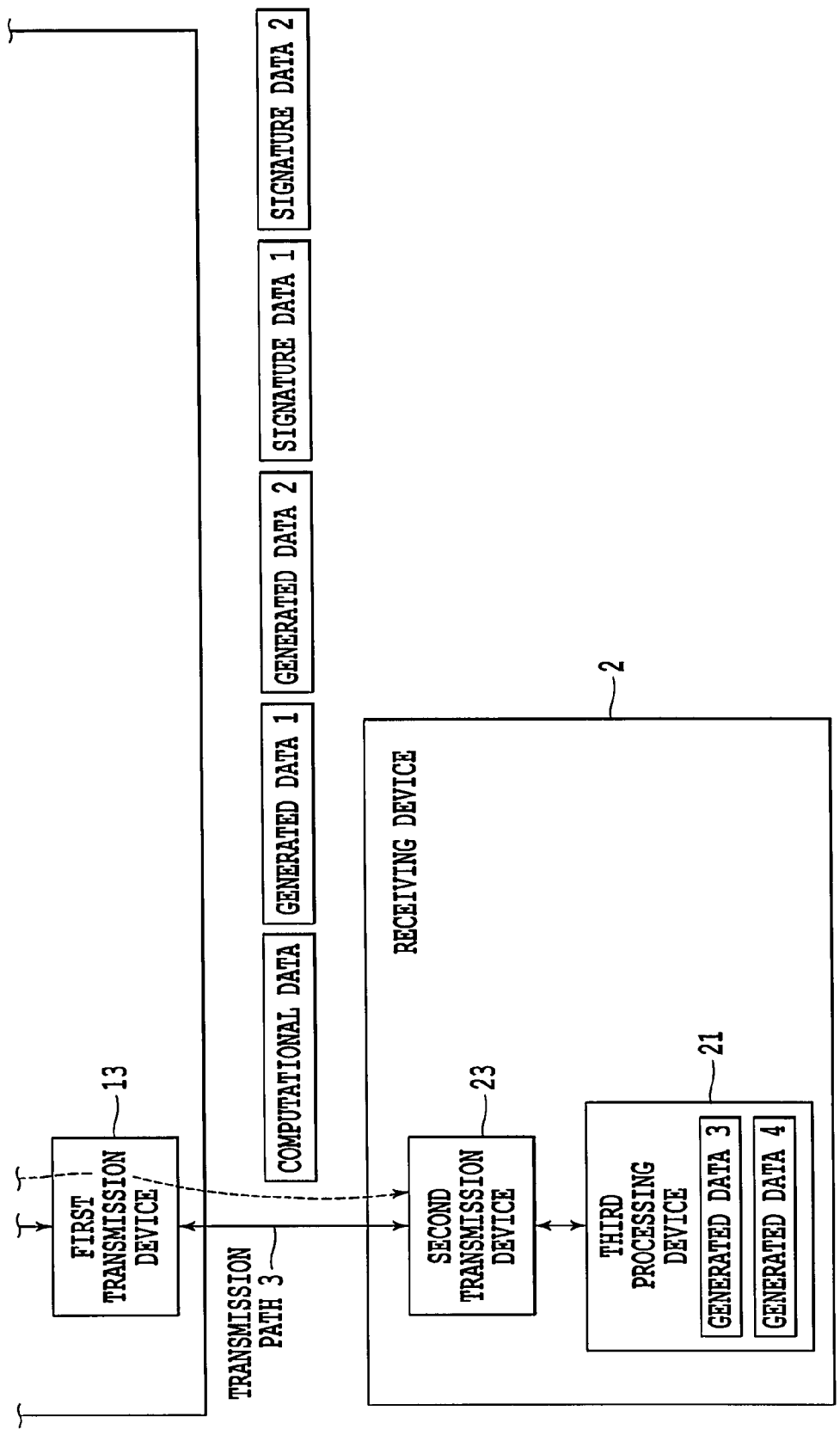
FIG. 5B is the second part of the operating diagram of a redundancy control system according to Embodiment 2 of the present invention.
Figure 6:
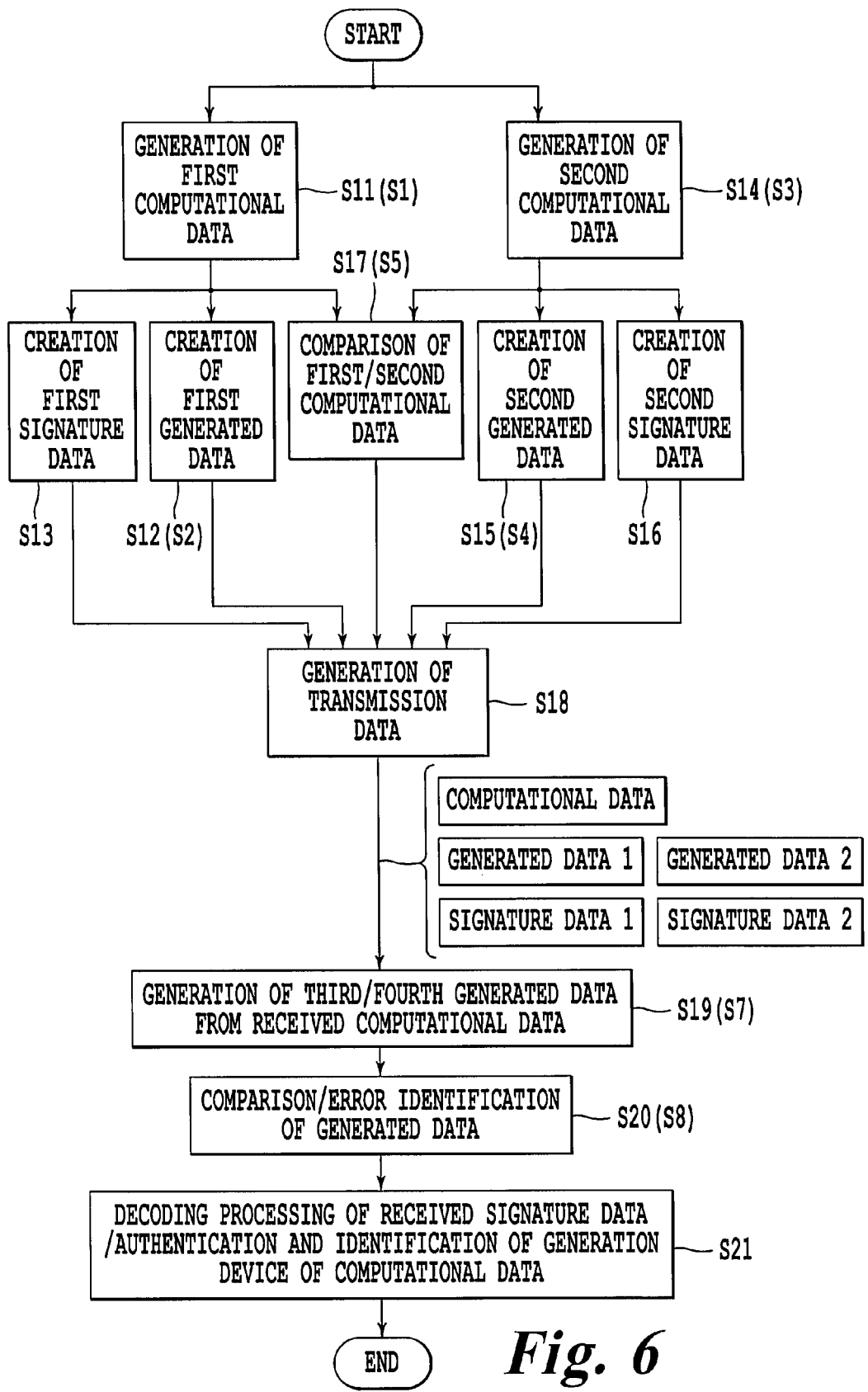
FIG. 6 is a flow chart given in explanation of the operation of the redundancy control system according to Embodiment 2 of the present invention.

As shown in FIGS. 5A-5B and FIG. 6, the aspect in which Embodiment 2 differs from Embodiment 1 is that a first signature data generating section 115 and second signature generating section 125 that guarantee the identity of the processing device that generated the respective computational data are respectively provided in the first processing device 11 and the second processing device 12, so that the third processing device 21 can authenticate and identify that the computational data generated at the receiving device 2 is data that has been transmitted from the correct device.

Specifically, the first processing device 11 additionally creates, in respect of the control data, first signature data, by performing encryption processing based on a first signature algorithm by a common key cryptosystem, and the second processing device 12 additionally creates, in respect of the control data, second signature data, by performing encryption processing based on a second signature algorithm by the preset common key cryptosystem.

Also, in addition, the first processing device 11 returns to the first transmission device 13 transmission data including the first signature data/second signature data; and the first transmission device 13 receives from the redundant processing device 14 transmission data including the generated data with the computational data/second generated data, and the first signature data/second signature data aforementioned, and sends these to the receiving device 2, which is the transmission source of the control data.

The third processing device 21 additionally performs decoding processing on the respectively received first signature data and second signature data, using the first signature algorithm and second signature algorithm that are the same as were set beforehand in the transmission source, and performs authentication to identify that the received first signature data is the data generated by the first processing device 11 and performs authentication to identify that the received second signature data is the data generated by the second processing device 12.

Next, the detailed layout of the redundant processing device of Embodiment 2 will be described likewise with reference to FIGS. 5A-5B. The first processing device 11 additionally comprises a first signature data creation section 115 that creates first signature data, using the first signature algorithm, constituting the preset common key cryptosystem, in respect of the control data delivered from the first transmission data management section 111, and sends this to the first transmission data management section aforementioned.

The second processing device 12 additionally comprises a second signature data creation section that creates second signature data, using the second signature algorithm, constituting the preset common key cryptosystem, in respect of the control data delivered from the second transmission data management section 121, and sends this to the second transmission data management section 121.

Next, the operation of Embodiment 2 constructed in this way will be described with reference to FIG. 6. Processing steps in Embodiment 2 shown in FIG. 6 constituting the same processing as processing steps of Embodiment 1 shown in FIG. 3 are indicated with the reference symbols of the corresponding steps in Embodiment 1 shown in brackets.

The first processing device 11 generates first computational data in accordance with the control data and generates (s11, s12) first generated data by using a first preset generation algorithm for error detection on response. And, in Embodiment 2, in addition, first signature data are generated (s13) using the preset first signature algorithm, in respect of the aforementioned first computational data.

Likewise, the second processing device 12 generates second computational data in accordance with the control data and generates second generated data (s14, s15) by using a second preset generation algorithm for error detection on response. In addition, second signature data are generated (s16) using the preset second signature algorithm, in respect of the aforementioned second computational data.

Also, in the transmission data management section 111, the first processing device 11 and second processing device 12 mutually compare (s17) the first computational data and second computational data, and mutually exchange the comparison results, to confirm coincidence thereof. Transmission data including the coincident computational data, first generated data and second generated data and, in addition, the first signature data/second signature data are then transmitted (s18).

Next, the receiving device 2 receives the transmitted data and generates third generated data and fourth generated data from the preset first generation algorithm and second generation algorithm and the computational data, and compares the first generated data with the third generated data, and the second generated data with the fourth generated data, so as to detect error in the received computational data (s19, s20).

In addition, decoding processing is performed on the respectively received aforementioned first signature data and second signature data, using the first signature algorithm and second signature algorithm that are the same as were set beforehand in the transmission source, and authentication is performed to identify (s21) that the received aforementioned first signature data is the data generated by the first processing device 11 and that the received second signature data is the data generated by the second processing device 12.

As described above, with Embodiment 2 constructed in this way, by providing the respective first signature data creation section 115 and second signature data creation section 125 in the first processing device 11 and second processing device 12 of the control device 1, it is possible for the receiving device 2 to recognize that the respective first signature data and second signature data have indeed been correctly created by the respective first processing device 11 and second processing device 12.

Also, since it can be authenticated that the received data have been generated by the first processing device and the second processing device, discrimination from transmission data generated by devices from transmission paths 3 other than devices constituting the network, and/or identification of spurious transmitted data injected through the network can be achieved.

Embodiment 3

Next, a redundancy control system according to Embodiment 3 will be described with reference to FIGS. 7A-7B. Portions in Embodiment 3 which are the same as portions shown in FIGS. 5A-5B are given the same reference symbols and further description is dispensed with.

Figure 7A:
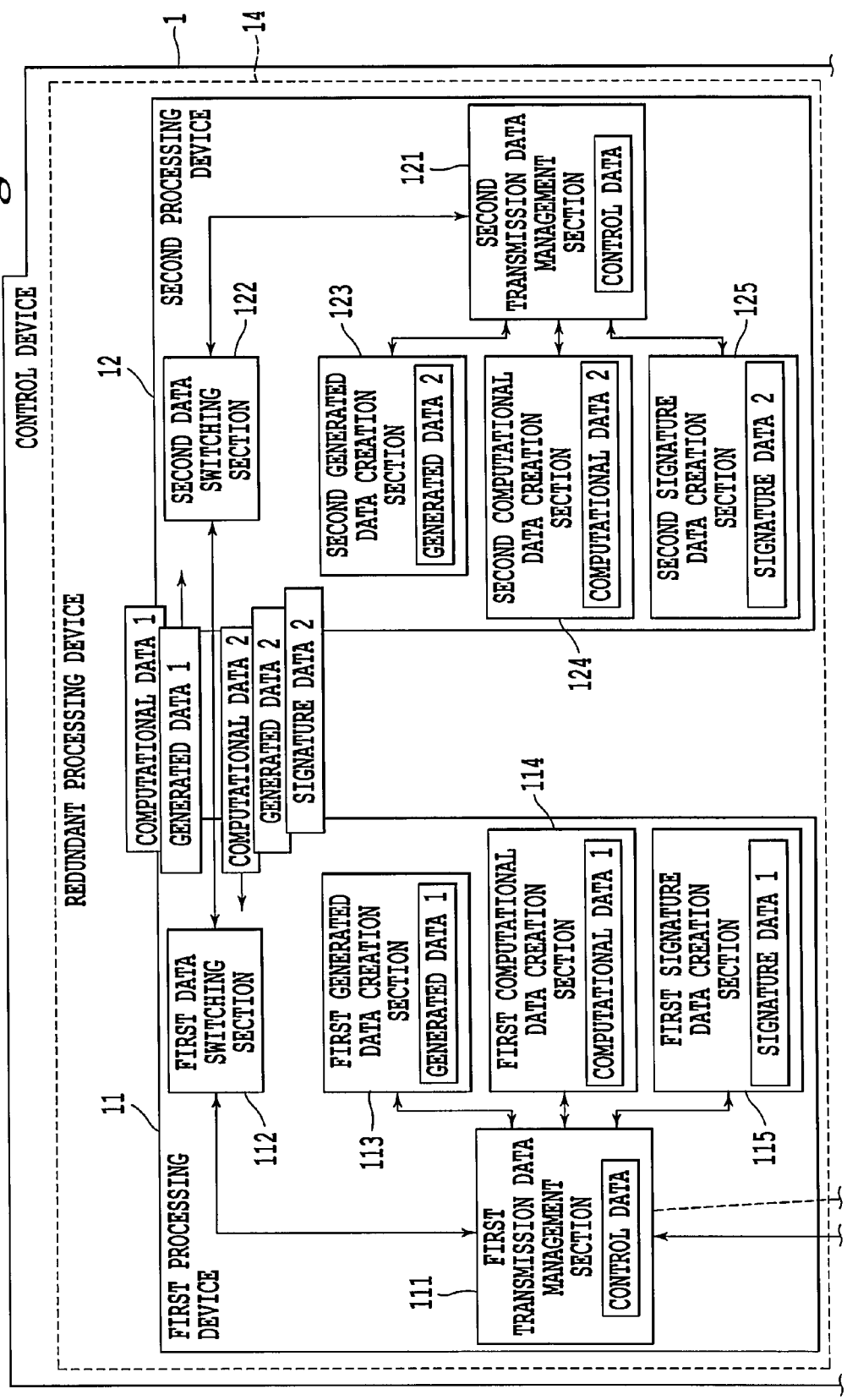
FIG. 7A is the first part of an operating diagram of a redundancy control system according to Embodiment 3 of the present invention.
Figure 7B:
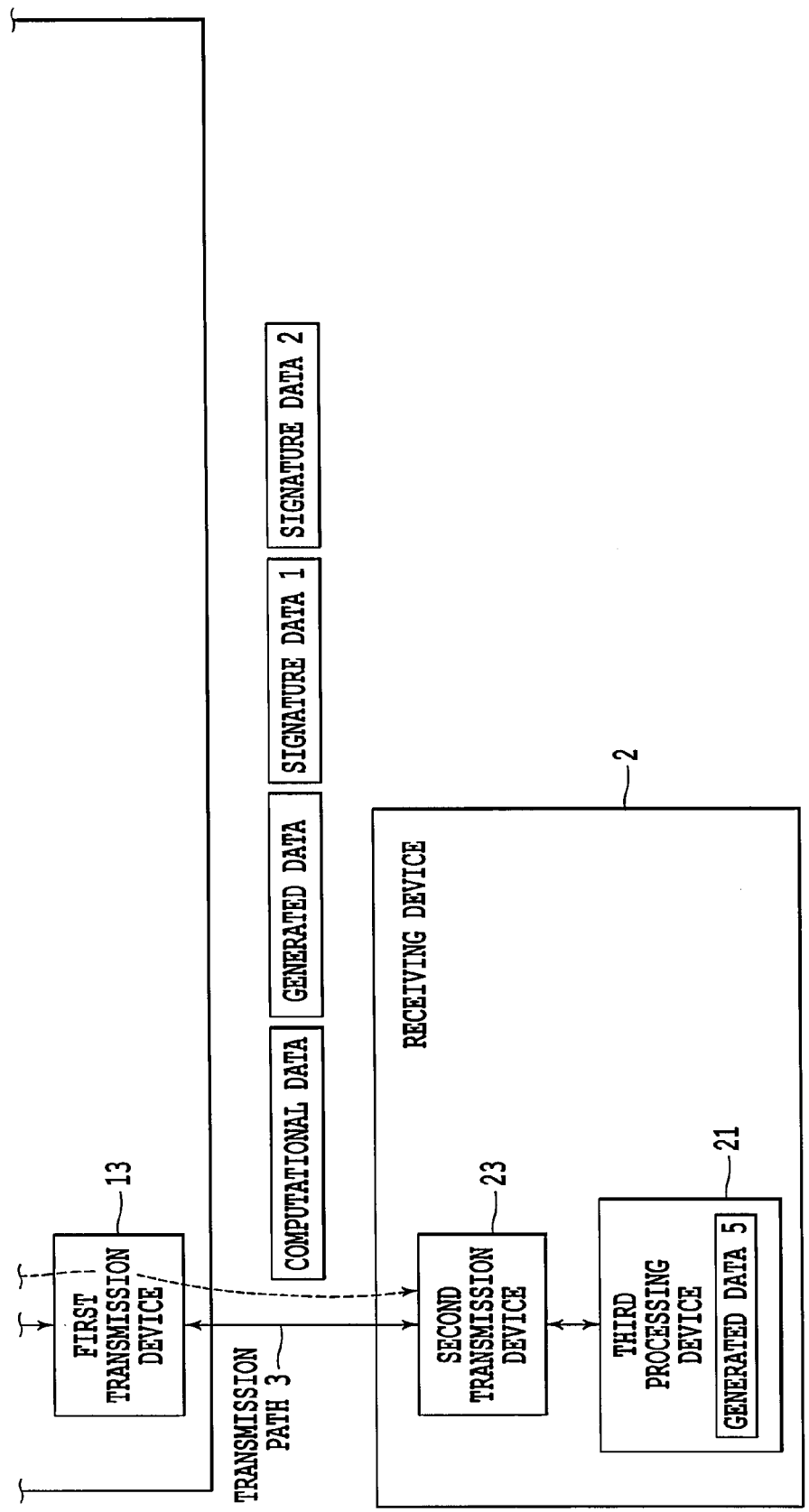
FIG. 7B is the second part of the operating diagram of a redundancy control system according to Embodiment 3 of the present invention.

As shown in FIGS. 7A-7B, the difference between Embodiment 3 and Embodiment 2 lies in that, whereas, in Embodiment 2, different generation algorithms were employed by the first processing device 11 and second processing device 12 to generate different first generated data and second generated data, in Embodiment 3, the same generation algorithm is used in the two processing devices to generate generated data of the same values: in this way, the amount of generated data that is transmitted is reduced.

In the redundant processing device 14 of Embodiment 3, in more detail, the first processing device 11 comprises a first transmission data management section 111 that receives control data from the first transmission device 13, sends this control data and first computational data to the first data switching section 112 and, after confirming coincidence of the mutual comparison result of the first computational data and second computational data by, additionally, mutually switching the first generated data and second generated data, deems the computational data and generated data to be the resulting coincident data, and creates and returns transmission data including these; a first computational data creation section 114 that receives the control data from the first transmission data management section 111 and creates and returns first computational data by executing a preset computation program; a first generated data creation section 113 that generates and returns the first generated data for error detection by employing a preset generation algorithm, on reception of the first computational data and return of the first computational data; a first data switching section 112 that transmits this computational data to the aforementioned second processing device 12 and that sends to the first transmission data management section 111 transmission data including the second computational data delivered from the second processing device and the comparison result; and a first signature data creation section 115 that creates first signature data by encryption processing of the control data delivered from the first transmission data management section 111, using a first preset signature algorithm constituting a common key cryptosystem, and sends this to the first transmission data management section 111.

Also, the second processing device 12 comprises a second data switching section 122 that receives control data and first computational data from the first processing device 11 and sends transmission data including the first computational data and second computational data and the result of comparison of the first generated data and second generated data to the first data switching section 112; a second transmission data management section 121 that receives control data from the second data switching section 122, creates transmission data and returns this to the first processing device 11; a second computational data creation section 124 that receives control data from the second transmission data management section 121, and creates and returns second computational data by executing the same computational program as was preset in the first processing device 11; a second generated data creation section 123 that receives second computational data from the second transmission data management section 121, and that generates and returns second generated data for error detection on the return of the second computational data, using the same generation algorithm as was preset; and a second signature data generation section 125 that creates second signature data by encryption processing in respect of the control data delivered from the second transmission data management section 121 using the second signature algorithm constituting the preset common key cryptosystem, and sends this to the second transmission data management section 121.

In addition, the second data switching section 122 receives the second signature data from the second transmission data management section 121 and transmits this to the first data switching section 121; the first transmission data management section 112 outputs the coincident computational data obtained by comparison of the first computational data and second computational data, the coincident generated data obtained by comparison of the first generated data/second generated data, and also the first signature data/second signature data.

Next, the operation of the redundancy control system 100 of Embodiment 3 constructed in this way will be described. The receiving device 2 receives from the redundant processing device 14 transmission data including computational data and generated data that have been subjected to mutual comparison by the first processing device 11 and second processing device 12, first signature data and second signature data.

The third processing device 21 of the receiving device 2 generates fifth generated data from the received computational data and the same generation algorithm as is preset and provided in the first/second processing devices in 11, 12, compares the received generated data and the fifth generated data, and thereby detects error in the computational data transmitted from the control device 1.

In addition, based on the preset first signature algorithm and second signature algorithm, authentication and identification are performed, by performing decoding processing on the respective received first signature data and second signature data, to authenticate and identify that the received first signature data are generated by the first processing device and that the received second signature data are generated by the second processing device.

With the third embodiment constructed as above, comparison of the first generated data and a second generated data of the control device 1 is performed in the redundant processing device 14 and only generated data that have been successfully compared are transmitted as transmission data: thus establishment of the presence or absence of failure of the first processing device 11 and second processing device 12 is performed by authentication and identification of the first signature data and second signature data.

Consequently, the amount of generated data becomes half the amount of data required to achieve the same benefit as in the case of Embodiment 2, so the amount of data on the transmission path 3 can be reduced.

Embodiment 4

Next, a redundancy control system according to Embodiment 4 will be described with reference to FIGS. 8A-8B and FIG. 9. Portions that are the same as portions shown in FIG. 9 are given the same reference symbols in Embodiment 4 and further description thereof is dispensed with.

Figure 8A:
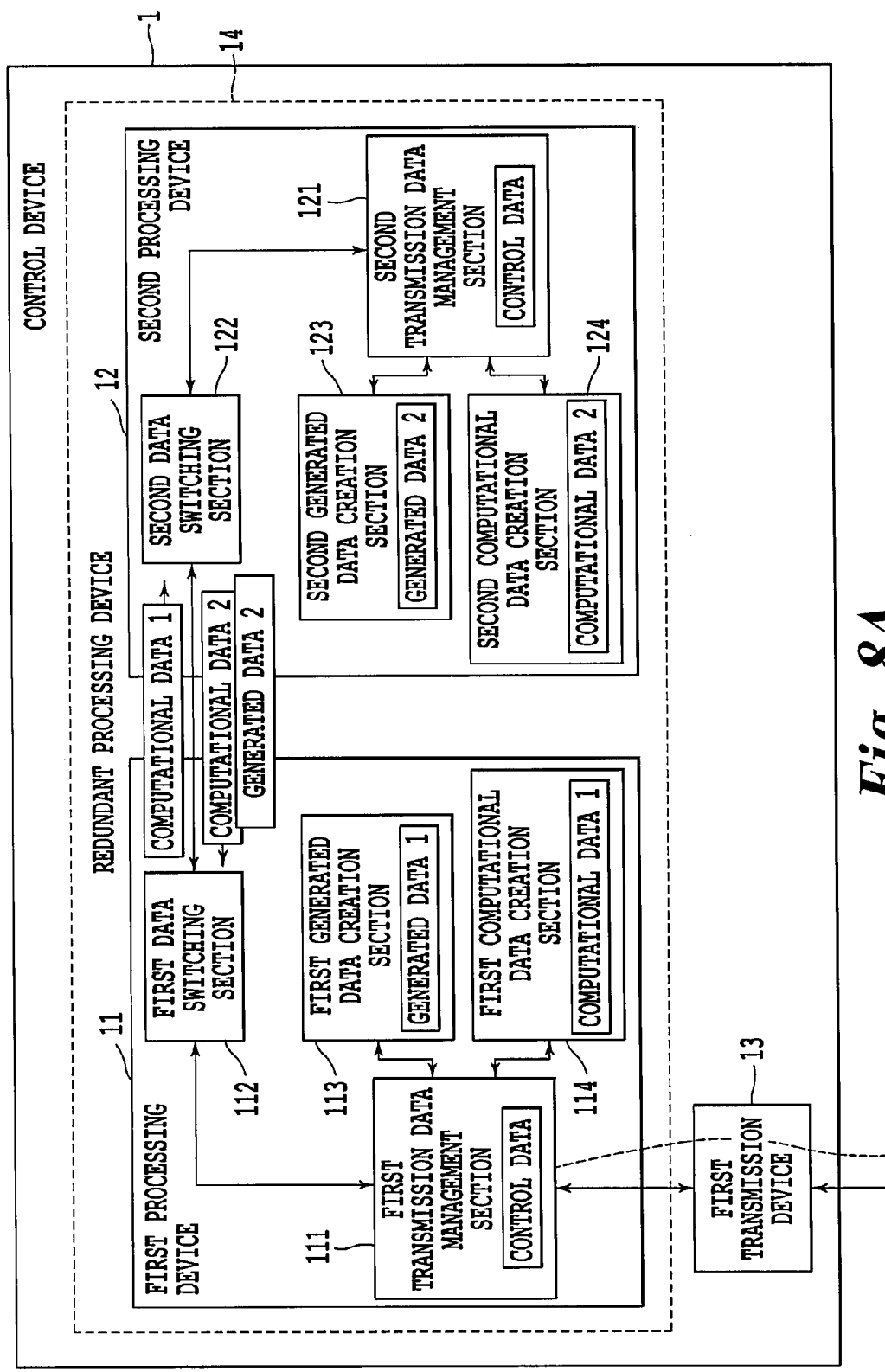
FIG. 8A is the first part of an operating diagram of a redundancy control system according to Embodiment 4 of the present invention.
Figure 8B:
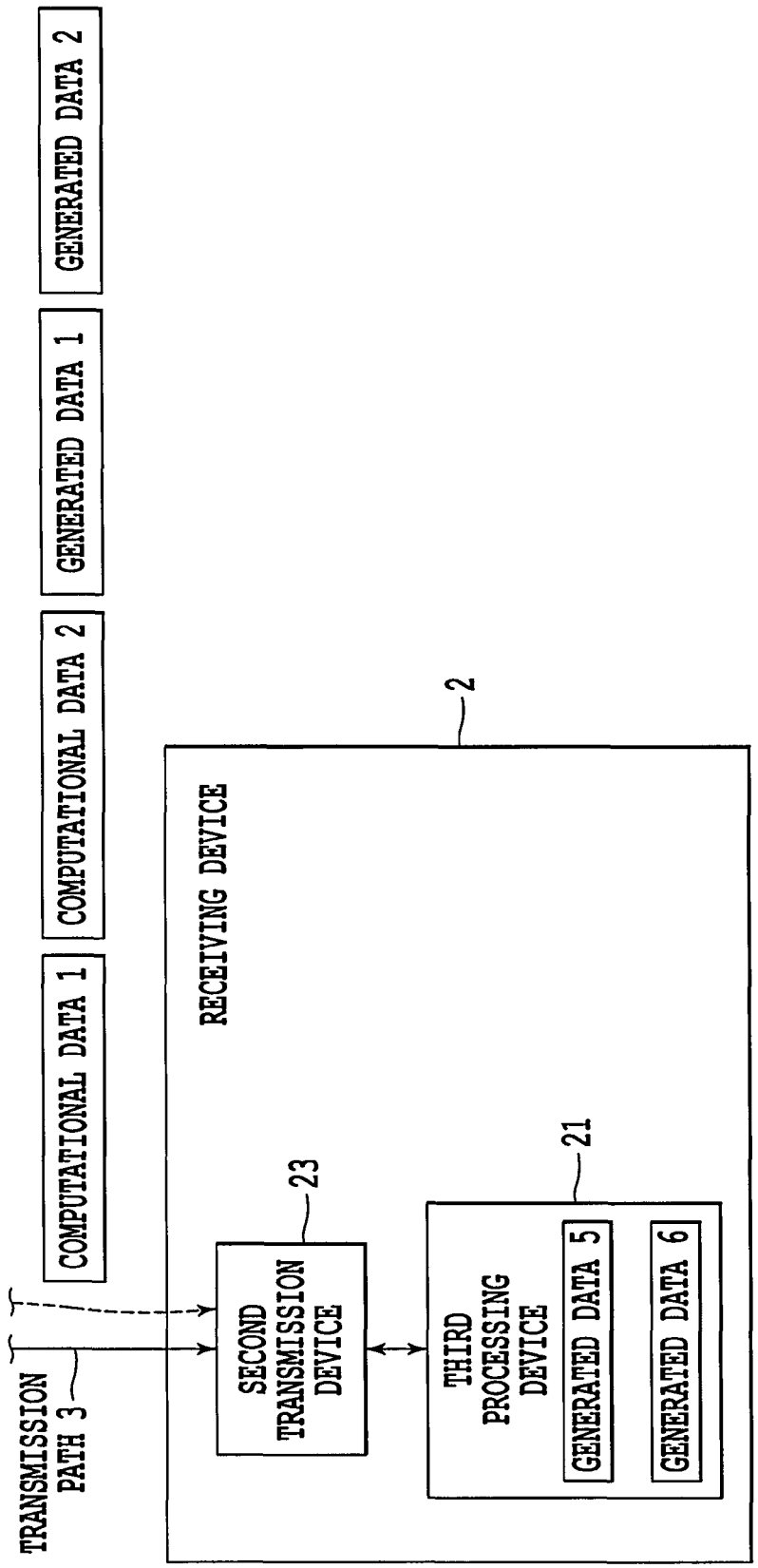
FIG. 8B is the second part of the operating diagram of a redundancy control system according to Embodiment 4 of the present invention.
Figure 9:
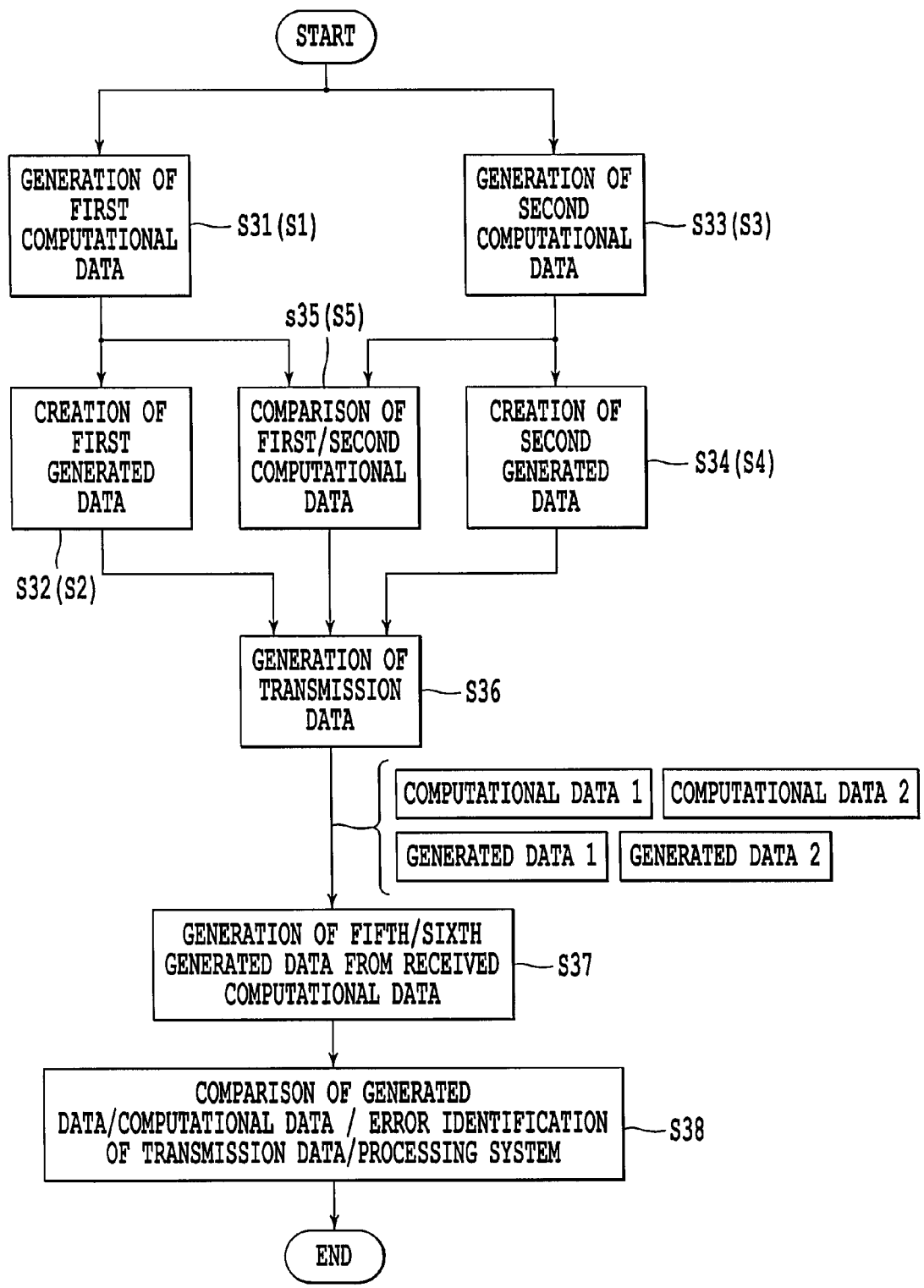
FIG. 9 is a flow chart given in explanation of the operation of the redundancy control system according to Embodiment 4 of the present invention.

As shown in FIGS. 8A-8B and FIG. 9, the difference between Embodiment 4 and Embodiment 1 lies in that, while, in Embodiment 1, the transmission data management section 111 compares the first computational data and the second computational data and generates a single set of coincident computational data as the transmission data, in the case of Embodiment 4, after comparison, the transmission data is generated by treating the first computational data and second computational data directly as transmission data, which are then transmitted to the receiving device 2.

Consequently, as shown in FIG. 9, the operation in this case is that transmission data are generated (s36) that are constituted by the first computational data, second computational data, first generated data and second generated data.

Thus the receiving device 2 receives this transmitted data and generates fifth generated data from the first computational data and the preset first generation algorithm that is the same as that of the transmission source and generates sixth generated data (s37) from the second computational data and the preset second generation algorithm that is the same as that of the transmission source.

Comparison is then performed (s38) on the first generated data and the fifth generated data, and on the second generated data and the sixth generated data, to thereby detect errors of the received first computational data or second computational data; also, comparison processing is performed on the received first computational data and second computational data, to identify the presence or absence of failure of the transmission source.

It therefore becomes possible to perform comparison of computational data at the two locations of the processing device and the receiving device, or to obtain a redundancy control system of high reliability which makes possible diagnosis, with redundancy, of computational data at a receiving device that can detect the presence or absence of respective errors in the first computational data and second computational data.

While various embodiments of the present invention have been described, these embodiments are given merely by way of example and are not intended to restrict the scope of the invention. Novel embodiments thereof, or implementations of these in various ways can be achieved and, without departing from the gist of the present invention, various elements may be dispensed with, substituted or modified. These embodiments and modifications thereof are included in the gist of the invention and are included in the scope of equivalents to the invention set out in the patent claims.

What is claimed is:

1. A redundancy control system having a redundant processing device of a comparison redundancy type that compares first computational data of a first processing device and second computational data of a second processing device that receive a same control data and that execute a same computational processing in parallel and that returns coincident computational data, said redundancy control system comprising:
   (1) a control device, wherein
      (i) said first processing device generates said first computational data in accordance with said control data and generates first generated data using a first preset generation algorithm for error detection with respect to said first computational data;
      said second processing device generates said second computational data in accordance with said control data and generates second generated data using a second preset generation algorithm for error detection with respect to said second computational data; and, in addition,
      said first processing device comprises: a redundant processing device that compares said first computational data and said second computational data, and outputs said coincident computational data and said first generated data and said second generated data; and
      (ii) a first transmission device that receives transmission data including said computational data and said first generated data and said second generated data, and sends these from said redundant processing device to a transmission source of said control data; and
   (2) a receiving device that comprises:
      a second transmission device that transmits said control data to said first transmission device and that receives said transmission data from said first transmission device; and
      a third processing device that respectively generates:
         third generated data and fourth generated data from received said computational data, and said first preset generation algorithm and said second preset generation algorithm,
      identifies the presence of an error in said received computational data by comparison of received said first generated data and said third generated data, and received said second generated data and said fourth generated data, and
      identifies a presence of failure of said first processing device or said second processing device,
   wherein the presence of the error in said received computational data is identified using a generation algorithm of each processing device that generates computational data.

2. The redundancy control system according to claim 1, wherein, in said redundant processing device,
   said first processing device comprises:
      (a) a first transmission data management section that receives said control data from said first transmission device, sends said control data and said first computational data to said first data switching section and mutually switches said first computational data and said second computational data, to confirm a coincidence of a mutual comparison result, and returns transmission data including said coincident computational data to said first transmission device;
      (b) a first computational data creation section that receives said control data from said first transmission data management section, and creates and returns said first computational data after executing a preset computational program;
      (c) a first generated data creation section that receives said first computational data and generates and returns said first generated data for error detection on return of said first computational data, using said first preset generation algorithm; and
      (d) a first data switching section that transmits said first computational data to said second processing device and that sends said transmission data including said second computational data delivered from said second processing device and said comparison result to said first transmission data management section; and
   said second processing device comprises:
      (d)' a second data switching section that receives said control data and said first computational data from said first processing device and sends said transmission data including the comparison result of said first computational data and said second computational data to said first data switching section;
      (a)' a second transmission data management section that receives said control data from said second data switching section, creates said transmission data, and returns said transmission data to said first processing device through said first data switching section;
      (b)' a second computational data creation section that receives said control data from said second transmission data management section, executes said preset computational program to create said second computational data, which said second computational data then returns; and
      (c)' a second generated data creation section that receives said second computational data from said second transmission data management section and generates and returns, using said second preset generation algorithm, said second generated data for error detection, on return of said second computational data.

3. The redundancy control system according to claim 1, wherein, in said redundant processing device:
said first processing device additionally creates first signature data with respect to said control data by encryption processing using a first signature algorithm of a preset common key cryptosystem;
said second processing device additionally creates second signature data with respect to said control data by encryption processing using a second signature algorithm of a preset common key cryptosystem;
said first processing device additionally returns to said first transmission device said transmission data including said first signature data and said second signature data;
said first transmission device additionally receives from said redundant processing device said transmission data including said computational data, said first generated data and said second generated data, and said first signature data and said second signature data, and sends these data to a transmission source of said control data; and
said third processing device, additionally, is arranged to perform decoding processing on received respective said first signature data and said second signature data, using said first signature algorithm and said second signature algorithm, so as thereby to authenticate and identify received said first signature data as having been generated by said first processing device and to authenticate and identify the received said second signature data as having been generated by said second processing device.

4. The redundancy control system according to claim 3, wherein, in said redundant processing device,
said first processing device comprises:
(a) a first transmission data management section that receives said control data from said first transmission device, sends said control data and said first computational data to a first data switching section, and mutually switches said first computational data and said second computational data, to confirm a coincidence of a mutual comparison result, and creates said transmission data including said coincident computational data, and returns said transmission data including said coincident computational data to said first transmission device;
(b) a first computational data creation section that receives said control data from said first transmission data management section and creates and returns said first computational data, after executing a preset computational program;
(c) a first generated data creation section that receives said first computational data and that generates and returns said first generated data for error detection on transmission of said first computational data, using said first preset generation algorithm;
(d) a first data switching section that transmits said first computational data to said second processing device and that sends said transmission data, including said second computational data and said comparison result delivered from said second processing device to said first transmission data management section; and
(e) in addition, a first signature data creation section that creates the first signature data by encryption processing using said first signature algorithm with respect to said control data delivered from said first transmission data management section, and sends said first signature data to said first transmission data management section; and said second processing device comprises:
(d)' a second data switching section that receives said control data and said first computational data from said first processing device and sends to said first data switching section said transmission data including a comparison result of said first computational data and said second computational data;
(a)' a second transmission data management section that receives said control data from said second data switching section, creates said transmission data and returns said transmission data to said first processing device, through said first data switching section;
(b)' a second computational data creation section that receives said control data from said second transmission data management section and creates and returns said second computational data, after executing said preset computational program;
(c)' a second generated data creation section that receives said second computational data from said transmission data management section and that generates and returns said second generated data for error detection on return of said second computational data, using said preset second generation algorithm; and
(e)' in addition, a second signature data creation section that creates second signature data by encryption processing using a second signature algorithm of a preset common key cryptosystem with respect to said control data delivered from said second transmission data management section, and sends said second signature data to said second transmission data management section.

5. A redundancy control system having a redundant processing device of a comparison redundancy type that compares first computational data of a first processing device and second computational data of a second processing device that receive a same control data and that execute a same computational processing in parallel and that returns coincident computational data, said redundancy control system comprising:
(1) a control device, wherein
(i) said first processing device generates said first computational data in accordance with said control data and generates first generated data using a first preset generation algorithm for error detection with respect to said first computational data;
said second processing device generates said second computational data in accordance with said control data and generates second generated data using a second preset generation algorithm for error detection with respect to said second computational data, and; in addition,
said first processing device comprises: a redundant processing device that compares said first computational data and said second computational data and, if coincidence is found, outputs said first computational data and said second computational data, and said first generated data and said second generated data; and
(ii) a first transmission device that receives transmission data including said first computational data and said second computational data, and said first generated data and said second generated data, and sends these data from said redundant processing device to a transmission source of said control data; and (2) a receiving device that comprises:
- a second transmission device that transmits said control data to said first transmission device and that receives said transmission data from said first transmission device; and
- a third processing device that respectively generates:
  - fifth generated data from received said first computational data and said first preset generation algorithm,
  - generates sixth generated data from said second computational data and said second preset generation algorithm,
  - detects a presence of an error in said received first computational data and said second computational data by comparison of said first generated data and said fifth generated data with said second generated data and said sixth generated data, and
  - detects a presence of failure by comparison of received first computational data and second computational data;
- wherein the respective presence of the error in said received first computational data and said received second computational data is identified by performing comparison of said first computational data and second computational data in parallel at a sending end and a receiving end.

6. A method of transmission of computational data in a redundancy control system having a control device that compares first computational data of a first processing device and second computational data of a second processing device that receive a same control data and execute a same computational processing in parallel, and that returns coincident computational data, and a receiving device that receives said computational data, said method of transmission of computational data comprising:
(1) in a control device,
  (i) in said first processing device, generating said first computational data in accordance with said control data and generating first generated data using a first preset generation algorithm for error detection with respect to said first computational data;
  (ii) in said second processing device, generating said second computational data in accordance with said control data and generating second generated data using a second preset generation algorithm for error detection with respect to said second computational data;
  (iii) in said first processing device and said second processing device, mutually comparing said first computational data and said second computational data and mutually switching a comparison result;
  (iv) in said first processing device, confirming coincidence of said comparison result of said first computational data and said second computational data and transmitting transmission data including said coincident computational data, said first generated data, and said second generated data;
(2) in said receiving device,
  (i) receiving said transmission data, and generating third generated data and fourth generated data from said computational data and said first preset generation algorithm and said second preset generation algorithm;
  (ii) comparing said first generated data and said third generated data and said first generated data and said third generated data, to detect an error in received said computational data; and wherein a presence of the error in received computational data is identified using a generation algorithm for each processing device that generates computational data.

7. A method of transmission of computational data in a redundancy control system having a control device that compares first computational data of a first processing device and second computational data of a second processing device that receive a same control data and execute a same computational processing in parallel, and that returns coincident computational data, and a receiving device that receives said computational data, said method of transmission of computational data comprising:
(1) in said control device,
  (i) in said first processing device, generating said first computational data in accordance with said control data and generating first generated data using a first preset generation algorithm for error detection with respect to said first computational data;
  (ii) in addition, generating first signature data with respect to said first computational data, using a first preset signature algorithm;
  (iii) in said second processing device, generating said second computational data in accordance with said control data and generating second generated data using a second preset generation algorithm for error detection with respect to said second computational data;
  (iv) in addition, generating second signature data with respect to said second computational data, using a second preset signature algorithm;
  (v) in said first processing device and said second processing device, mutually comparing said first computational data and said second computational data, mutually switching a comparison result, and sending said second generated data to said first processing device;
  (vi) in said first processing device, confirming coincidence of said comparison result of said first computational data and said second computational data and transmitting transmission data including said coincident computational data, said first generated data, said second generated data, said first signature data, and said second signature data;
(2) in said receiving device,
  (i) receiving said transmission data, and generating third generated data and fourth generated data from said computational data and said first preset generation algorithm and said second preset generation algorithm;
  (ii) comparing said first generated data and said third generated data and said second generated data and said fourth generated data, to detect an error in received said computational data;
  (iii) generating respectively third signature data and fourth signature data, using said first preset signature algorithm and said second preset signature algorithm, from said computational data; and
  (iv) independently comparing said first signature data and said third signature data, and said second signature data and said fourth signature data, to perform authentication and identification as to whether or not received computational data is data from a preset processing device, wherein error identification of said received computational data and authentication and identification of a device that generated said computational data are thereby performed.

8. A method of transmission of computational data in a redundancy control system having a control device that compares first computational data of a first processing device and second computational data of a second processing device that receive a same control data and execute a same computational processing in parallel, and that returns coincident computational data, and a receiving device that receives said computational data, said method of transmission of computational data comprising:

(1) in said control device,
   (i) in said first processing device, generating said first computational data in accordance with said control data and generating first generated data using a first preset generation algorithm for error detection with respect to said first computational data;
   (ii) in said second processing device, generating said second computational data in accordance with said control data and generating second generated data using a second preset generation algorithm for error detection with respect to said second computational data;
   (iii) in said first processing device and said second processing device, mutually comparing said first computational data and said second computational data and mutually switching a comparison result; and
   (iv) in said first processing device, confirming coincidence of said comparison result of said first computational data and said second computational data and transmitting transmission data including said first computational data and said second computational data, said first generated data and said second generated data;

(2) in said receiving device,
   (i) receiving said transmission data, and generating fifth generated data from said first computational data and said first preset generation algorithm;
   (ii) receiving said transmission data, and generating sixth generated data from said second computational data and said second preset generation algorithm; and
   (iii) comparing said first generated data and said fifth generated data and said second generated data and said sixth generated data, to detect an error in received said first computational data and said second computational data, and comparing received said first computational data and said second computational data, wherein detection of respective presence of the error in said received first computational data and said second computational data, and comparison of first computational data and second computational data, are thus effected in parallel at a transmitting end and a receiving end.

* * * * *